Patented Sept. 1, 1953

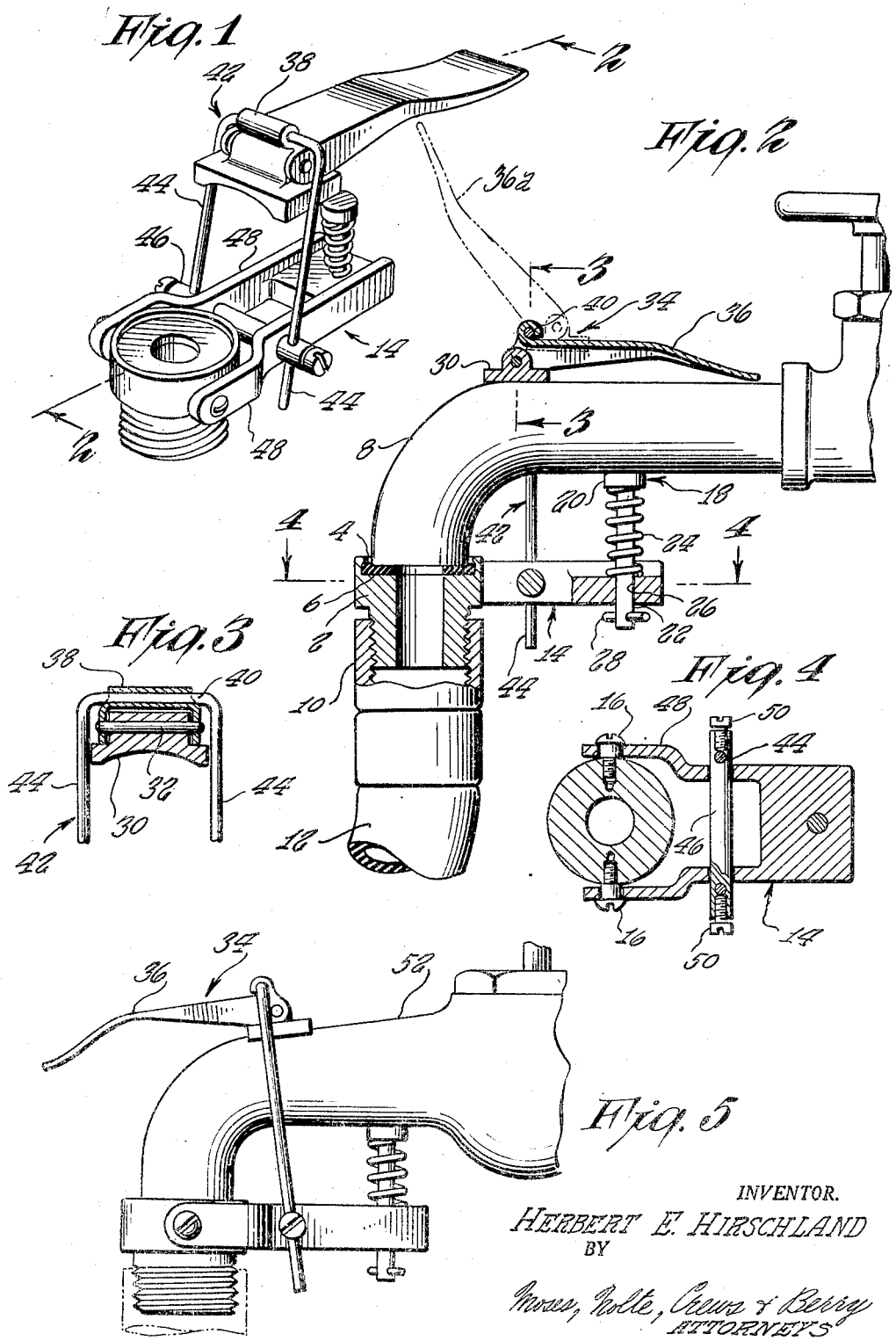

2,650,838

UNITED STATES PATENT OFFICE 2,650,838

FAUCET CONNECTOR

Herbert E. Hirschland, Rahway, N. J.

Application February 21, 1951, Serial No. 212,169

4 Claims. (Cl. 285—108)

This invention relates to faucet connectors for facilitating the attachment of a hose or a hose connecting unit to an unthreaded faucet.

It is a primary object of the invention to provide a faucet connector which is adapted to be snapped quickly and securely into place on an unthreaded faucet of purely conventional construction, and to be removed from the faucet with the same speed and ease. While a connector of this kind may be left in place upon a faucet for protracted periods if desired, its especial advantage lies in the fact that it is so easy to remove and reapply that it can be used conveniently with a faucet which must also be used regularly with the connector removed. A connector of this kind would be especially convenient, for example, where a sink or basin faucet is required daily to deliver water through a hose to a baby's bathinet, but is also required normally to be available without the hose.

It is a further object of the invention to provide a connector of the kind referred to which includes an attaching clamp having a pivoted operating handle, and in which provision is made for reversing the direction of operation of the handle in relation to the other parts for the purpose of adaptation to different faucets.

It is a still further object to provide a connector with a lever operated clamp having a substantially definite operating stroke and embodying means for relatively adjusting the clamping members to adapt the connector for different faucets.

It is a still further object to provide a faucet connector which is simple and economical to manufacture, of rugged construction, and efficient and dependable in operation.

Other objects and advantages will hereinafter appear.

In the drawing forming part of this specification

Figure 1 is a perspective view of a connector embodying the invention;

Figure 2 is a fragmentary view, partly in section, showing the connector of Figure 1 applied to a conventional threadless faucet;

Figure 3 is a sectional, detail view taken upon upon the line 3—3 of Figure 2, looking in the direction of the arrows;

Figure 4 is a sectional, detail view taken upon the line 4—4 of Figure 2, looking in the direction of the arrows; and Figure 5 is a fragmentary view in side elevation showing the connector applied to another conventional faucet but with the handle and associated parts readjusted to accommodate peculiarities of the faucet involved.

The novel connector comprises a connecting member or nipple 2 having a seat 4 adapted to bear through a washer against the mouth of a conventional threadless faucet 8. The connector or nipple 2 may have screwed onto it a conventional coupling 10 of a hose 12.

A forked lever 14 embraces the connecting member 2, and is pivotally connected to it through diametrically opposed pivot screws 16. The lever 14, at its opposite end, supports a first clamping member 18 in the form of a spring plunger. The plunger comprises a head 20 and a stem 22. The stem is passed through a compression coil spring 24 and is then passed downward through a bore 26 provided in the lever 14. A cross pin 28 is driven through the protruding lower end of the stem 22 to maintain the parts in assembled relation. The head 20 is intended, when the connector is put in place upon a faucet 8, to bear upward against the lower face of the faucet body.

The connector further includes an opposed clamping member 30 in the form of a fulcrum block which is adapted to bear downward against the upper face of the faucet body as seen in Figure 2. The fulcrum block 30, through a pivot pin 32, pivotally supports a bell crank lever 34 which includes a handle arm 36 and a work arm 38. The work arm 38 pivotally carries the body 40 of a U-shaped pull link 42. The legs 44 of the line 42 extend downward in parallel relation and pass through a pivot rod 46 which is rotatably carried in the arms 48 of the forked lever 14. Set screws 50, threaded into the rod 46 from opposite ends thereof, bear against the respective legs 44 to fix them in place relative to the rod 46.

In applying the connector to the faucet 8 of Figure 2, the handle 36 is placed initially at its counterclockwise limit of movement relative to the fulcrum block 30, as illustrated in dot and dash lines at 36a. The connector 2 and the plunger head 20 are set firmly but loosely against the faucet mouth and the lower side of the faucet body, respectively. The handle 36 is then seized and pushed to rock the links 42 about the axis of the feed rod 46 for carrying the fulcrum block 30 to the position illustrated on top of the body of the faucet 8.

In this position and condition of the parts the fulcrum block should loosely engage the upper face of the body of the faucet 8. The handle 36 is then turned about 32 as a center to the position illustrated in full lines in Figure 2. This carries the link body 40 upward from approximately the level of the pin 32 to a position substantially above the pin. The raising of the link 42 pulls upward upon the lever 14, placing the spring 24 under compression. Since the link 42 is connected to the lever 14 substantially midway between its ends, the upward pressure is distributed substantially equally between connector seat 6, on the one hand, and the plunger head 20 on the other.

The link body 40 is caused to travel across the common axial plane of the pin 32 and the rod 46, the crossing position being a dead center position. After the link body 40 has crossed dead center, the tendency of the spring 24 is to urge the handle arm 36 clockwise to its clockwise limit of movement as illustrated.

The handle is limited in its clockwise movement by engagement with the fulcrum block 30. It extends lengthwise of the faucet body and in proximity to it. By the toggle action which has been described, the opposed clamping members 20 and 30 are effectively located in clamping position, while the connector member 2 is urged strongly but yieldingly upward against the faucet mouth. As previously noted, the plunger head 20 and the connecting member 2 constitute balanced clamping members which cooperate with the opposed clamping member 30.

It is a feature of the invention that the link 42 is adjustably connected to the pivot rod 46. Adjustment can be effected by partially backing out the set screws 50, shifting the link 42 relative to the rod 46, and tightening the set screws again. This is important because it enables the opposed clamping members to be relatively adjusted.

If, when the connecting member 2 and the plunger head 20 have been placed against the faucet and the fulcrum block 30 has been swung into place over the faucet, the several parts are caused to engage the faucet with light frictional pressure, the desired relationship for that particular faucet will have been produced. The fulcrum block 30 will tend to hold its position on the faucet, while the handle is being operated about the fulcrum pin 32 to put on the pressure, and the operation of the handle to locking position will put on a desirable amount of pressure, ample to clamp the parts securely in place and to provide a leakproof joint, yet light enough to impose no objectionable resistance to the operation of the handle.

It is also an advantageous point that the link 42 is detachably connected to the pivot rod 46, as will be made clear from a comparison of Figure 2 with Figure 5. By partially backing out the set screws 50 from the pivot rod 46, the legs 44 of the link 42 will be released so that they may be completely withdrawn from the pivot rod. This separates the assembly consisting of the link 42, the fulcrum block 30 and the lever 34 from the other parts so that this assembly can be turned around and reapplied to the pivot rod with the legs 44 reversed in position. This, of course, also results in the turning around of the fulcrum block 30 and the handle 36. The parts may be secured in this new relationship by retightening the set screws 50.

The faucet 52 of Figure 5 illustrates why this reversal of parts may be desirable. When the faucet body is long enough, as shown in Figure 2, to permit the handle 36 to lie down closely adjacent to the faucet body, the arrangement of Figure 2 is preferable. With a shorter bodied faucet like the faucet 52, such a disposition of the handle is not possible and resort must be had to an arrangement in which the handle is caused to project outward so that it may project outward beyond the faucet when locked.

Since a given connector would ordinarily be assigned to use with a particular faucet, there would seldom be any occasion to disturb the connection of the legs 44 to the pivot rod 46 more than once. The capability of reversal and of adjustment as to length are both very important, however, since these features enable a single connector to be applied to faucets of various dimensions. This is an advantage to the manufacturer and to the distributor because only one device has to be provided for a variety of services. It is also a matter of great convenience to the user because he is not required to discriminate between a multiplicity of connectors, but can depend upon the adaptability of a single connector to almost any conventional faucet.

I have described what I believe to be the best embodiments of my invention. I do not wish, however, to be confined to the embodiments shown, but what I desire to cover by Letters Patent is set forth in the appended claims.

I claim:

1. In a faucet connector, in combination, a connecting member having a seat adapted to bear against a faucet mouth, a lever pivotally connected at one end to said connecting member, a first clamping member carried at the opposite end of the lever and adapted to bear upward against the lower side of the faucet body, a second clamping member opposed to the first clamping member, and clamp operating toggle mechanism interconnecting the clamping members, one of said clamping members being a spring plunger yieldable in response to force exerted by the toggle mechanism.

2. In a faucet connector, in combination, a connecting member having a seat adapted to bear against a faucet mouth, a forked lever pivotally connected at one end to the connecting member, a spring plunger carried at the opposite end of the lever and adapted to bear upward against the lower side of the faucet body, a clamping fulcrum block opposed to said plunger, a bell crank lever pivoted on said fulcrum block, and including a handle arm and a work arm, and a pull link interconnecting the work arm of the bell crank lever with an intermediate portion of the forked lever, the construction and arrangement being such that the link is pulled upward and carried across the fulcrum of the bell crank lever by the handle to cause the connector to be locked on by a toggle action.

3. In a faucet connector, in combination, a connecting member having a seat adapted to bear against a faucet mouth, a first lever pivotally connected at one end to the connecting member, a first clamping member in the form of a spring plunger carried at the opposite end of said lever in position to bear upward against the faucet body, a second clamping member in the form of a fulcrum block disposed to bear downward against the faucet body, and clamp operating mechanism interconnecting the fulcrum block and the lever, said mechanism including a handle lever pivotally connected to the fulcrum block, and a pull link interconnecting said levers, and means for separably connecting the link to the first lever in either of two distinct positions such that the handle when in locking position may be caused to extend lengthwise of the faucet in either one direction or the other.

4. In a faucet connector, in combination, a connecting member having a seat adapted to bear against a faucet mouth, a first lever pivotally connected at one end to the connecting member, a first clamping member in the form of a spring plunger carried at the opposite end of said lever in position to bear upward against the faucet body, a second clamping member in the form of a fulcrum block disposed to bear downward against the faucet body, a bell crank lever pivoted on the fulcrum block, said lever having a handle arm and a work arm, a U-shaped link having its body pivoted on said work arm and its legs extending downward therefrom, a pivot rod rotatably mounted in the first lever, and means detachably connecting the legs of the link to said pivot rod, whereby the link together with the fulcrum block and the bell crank lever may be separated from the first lever, turned around and reattached.

HERBERT E. HIRSCHLAND.

References Cited in the file of this patent

UNITED STATES PATENTS

| Number | Name | Date |
|---|---|---|
| 928,817 | Strom | July 20, 1909 |
| 1,936,868 | Whitney | Nov. 28, 1933 |

FOREIGN PATENTS

| Number | Country | Date |
|---|---|---|
| 583,137 | Great Britain | Dec. 10, 1946 |